US009127990B2

(12) United States Patent
Rabinowitz et al.

(10) Patent No.: US 9,127,990 B2
(45) Date of Patent: Sep. 8, 2015

(54) LOWER THRESHOLD TEMPERATURE INDICATOR DEVICE (75) Inventors: Avi Rabinowitz, Even Yehuda (IL); Erez Magen, Even Yehuda (IL)

(73) Assignee: Timestrip UK Limited, London (GB)

( * ) Notice: Subject to any disclaimer, the term of this patent is extended or adjusted under 35 U.S.C. 154(b) by 330 days.

(21) Appl. No.: 13/882,885

(22) PCT Filed: Nov. 15, 2011

(86) PCT No.: PCT/GB2011/052223
§ 371 (c)(1),
(2), (4) Date: May 1, 2013

(87) PCT Pub. No.: WO2012/066320
PCT Pub. Date: May 24, 2012

(65) Prior Publication Data
US 2013/0220209 A1 Aug. 29, 2013

(30) Foreign Application Priority Data
Nov. 15, 2010 (GB) .................................. 1019308.4

(51) Int. Cl.
*G01K 11/06* (2006.01)
*G01K 3/04* (2006.01)
(52) U.S. Cl.
CPC . *G01K 11/06* (2013.01); *G01K 3/04* (2013.01)
(58) Field of Classification Search
CPC .................................. G01K 3/04; G01K 11/06
USPC ................ 116/206, 207, 216, 217, 218, 219;
374/106, 160, 162
See application file for complete search history.

(56) References Cited

U.S. PATENT DOCUMENTS

| 4,145,918 A | 3/1979 | Couch et al. |
| 4,432,656 A | 2/1984 | Allmendinger |
| 4,457,253 A | 7/1984 | Manske |
| 4,846,095 A | 7/1989 | Emslander |
| 5,964,181 A | 10/1999 | Pereyra |
| 7,232,253 B2 | 6/2007 | Isbitsky et al. |
| 7,475,653 B2 * | 1/2009 | Drummond et al. .......... 116/217 |
| 2009/0170187 A1 | 7/2009 | Gundry |

FOREIGN PATENT DOCUMENTS

WO    WO 0173388 A1 *  10/2001  ............. G01K 11/06

* cited by examiner

*Primary Examiner* — R. A. Smith
(74) *Attorney, Agent, or Firm* — Burns & Levinson LLP (57) ABSTRACT A device for indicating that an ambient temperature has fallen to or below a predetermined lower threshold temperature. The device includes: a porous membrane having first and second spatially separate zones; a first freezable liquid infused in the porous membrane, the first freezable liquid having a freezing point corresponding to the predetermined lower threshold temperature; a second liquid for contacting the first zone of the porous membrane, the second liquid being immiscible with the first liquid; and an indicator window for indicating migration of the second liquid from the first zone to the second zone. The membrane infused with the first liquid is impervious to the second liquid above the threshold temperature and is permeable to the second liquid at or below the threshold temperature. The device is useful in applications where products degrade below a certain lower threshold temperature.

20 Claims, 11 Drawing Sheets

LOWER THRESHOLD TEMPERATURE INDICATOR DEVICE

CROSS-REFERENCE TO RELATED APPLICATIONS

This application is a U.S. national stage application under 35 U.S.C. 371 of co-pending International Application No. PCT/GB2011/052223, filed on Nov. 15, 2011, and entitled, "LOWER THRESHOLD TEMPERATURE INDICATOR DEVICE," which in turn claims the benefit of and priority to Great Britain Patent Application No. 1019308.4, filed on Nov. 15, 2010, both of which are incorporated by reference herein in their entirety for all purposes.

FIELD OF THE INVENTION

This invention relates to a lower threshold indicator device for indicating that an ambient temperature has fallen to or below a predetermined threshold temperature. It has been developed primarily for use in combination with products which are sensitive to temperatures below a particular threshold temperature. For example, the device may be a freeze indicator, which indicates that an ambient temperature has fallen to or below a freezing point of water, although the invention is not limited merely to freeze indicators.

BACKGROUND OF THE INVENTION

Many products, when subjected to freezing conditions, deteriorate rapidly to the point where they are seriously affected by loss of quality, loss of activity or are rendered totally unusable. A vivid example of such deterioration is soluble vaccines. In a 1996 report published in the Bulletin of the World Health Organization (74, 391-397) it was disclosed that 99% of a shipment of Hepatitis B vaccines was rendered useless because of a freeze/thaw cycle that occurred somewhere in the supply chain. Such de-activation of the vaccine usually goes undetected thereby resulting in zero protection for injected adults and children. Other examples where freezing has a detrimental effect include: medicines, human organs, pharmaceuticals, foods such as mayonnaise, fabric softeners, latex products such as paints, concrete modifiers, laboratory supplies, flowers etc. Biological samples such as whole blood, insulin and the like can be seriously affected or lost when subjected to freezing conditions (or near freezing conditions), and this is also true for high value biotechnology drugs containing proteins, enzymes or peptides. Therefore, it is desirable to the seller, buyer and end user of such products that some indicator means be provided which will signal a change in products caused by freezing conditions.

It is not only freezing conditions that potentially degrade certain products. In the case of vaccines, these are optimally stored at 2-8° C. Therefore, traditional freeze indicators, which provide an indication that temperatures have fallen below the freezing point of water, are not, in fact, optimal for this purpose.

A lower threshold indicator is potentially useful in preparing and serving hot food, especially in a professional setting. Once hot food has been prepared for serving, it is desirable to know if the temperature of this food has fallen below a lower threshold temperature at which bacteria propagate. For example, it may be desirable to indicate whether the hot food has fallen to a temperature below about 60° C., and, more desirably, to indicate a period over which the food has been left to stand below this lower threshold temperature.

A number of freeze indicators are known in the art. Problems associated with these prior art devices include high cost including reliance on expensive materials such as gold, slow response time, size, limited shelf life and lack of clarity in indication.

PTL 0001: U.S. Pat. No. 4,846,095 A (EMSLANDER). 1989 Jul. 11.

describes a device for indicating that an ambient temperature has fallen to or below a predetermined lower threshold temperature, comprising a porous membrane in contact with a mixture of two liquids held within a receptacle. On partial freezing of one component the remainder can wet the membrane.

PTL 0002: U.S. Pat. No. 4,457,253 A (MANSKE). 1984 Jul. 3.

describes a device that uses fatty acid esters for their versatile freezing points. The fatty acid is a liquid at the end of the capillary tube and it shrinks in order to draw a dyed compound into a plug. There is a separating liquid (immiscible with the dye and the fatty acid) to stop the plug being prematurely soaked.

It would be desirable to provide a lower threshold indicator device, which overcomes or at least ameliorates some of the shortcomings of the prior art devices. In particular, it would be desirable to provide a lower threshold indicator device which is inexpensive, provides excellent binary indication to end users and responds rapidly to temperatures below the lower threshold. It would be further desirable to provide a lower threshold indicator device which can be activated for use by the end user. It would be further desirable to provide a lower threshold indicator device which provides an indication of a period of time spent at or below the lower threshold temperature.

SUMMARY OF THE INVENTION

The present invention, as defined in the claims, uses a novel mechanism in which a porous membrane infused with a first freezable liquid is switched at the threshold temperature between a state in which another liquid immiscible with the first, typically a colorant, can pass through the membrane to provide the required indication.

The present invention advantageously provides a rapid and clear indication that an ambient temperature has fallen to or below a predetermined lower threshold temperature. In contrast with many prior art devices, the device of the present invention is not limited merely to indicating whether the ambient temperature has fallen below the freezing point of water. Depending on the choice of the first freezable liquid, the device may be used to indicate virtually any lower threshold temperature. Furthermore, and in contrast with some prior art devices, the device of the present invention requires no exotic materials (e.g. gold) and is therefore relatively inexpensive to produce.

Advantageously, the membrane functions in cooperation with the first liquid to facilitate migration of the second liquid upon freezing of the first liquid. Without wishing to be bound by theory, it is understood by the present inventors that pores in the membrane are blocked by the first liquid above the threshold temperature, thereby making the membrane impervious to the second liquid. However, freezing of the first liquid at the threshold temperature causes the solidified first liquid to contract and cling to the fibrous structure of the membrane, thereby opening up the pores and allowing migration of the second liquid through the membrane.

Preferably, the membrane has a thickness of 50 to 500 microns (more preferably 100 to 300 microns) so that the migration through the membrane is relatively rapid once the threshold temperature has been reached. Migration is typically more rapid with thinner membranes and the migration rate may be controlled by varying the membrane thickness, as desired. A response time of the device according to the present invention is typically less than 10 minutes, less than 5 minutes, or less than 1 minute. In contrast with prior art devices, the present invention allows response times to be varied in accordance with consumer preferences by varying the membrane thickness and/or pore size.

Preferably, the pore size of the membrane is in the range of 50 nm to 5 microns, preferably 100 nm to 2 microns. The migratory effect required for the present invention has been observed with both relatively small pore sizes (e.g. 50 nm to 300 nm) and relatively large pore sizes (e.g. 0.5 to 2 microns). Migration is typically more rapid with larger pore sizes and the migration rate may be controlled by varying the pore size, as desired.

The membrane itself may be comprised of any suitable porous material, such as microporous polymer membranes as are known in the art. Typically, the membrane is a polyolefin, including polyethylenes (e.g. HDPE, PTFE etc.) or polypropylenes. In order to facilitate migration of the second liquid (which is typically hydrophilic), the membrane may be impregnated with hydrophilic inorganic particles, such as silicon dioxide, titanium dioxide, aluminium oxide, calcium carbonate etc., although the addition of such inorganic particles is not essential. Migration rates, and hence response times, may be varied by employing different membrane types. Examples of suitable commercially-available microporous membranes include Artisyn™ membranes (available from Daramic, Inc.), Tetratex® membranes (available from Donaldson Company, Inc.) and Teslin® membranes (available from PPG Industries).

In one embodiment, the device is a simple binary indicator device in which a first side of the membrane defines the first zone and an opposite second side of the membrane defines the second zone. Hence, the migration of the second liquid is through a thickness of the membrane from a first side to a second side.

Preferably, an indicator window is positioned for visually inspecting the second side of the membrane. When the second coloured liquid has reached the second side of the membrane, the user is provided with a clear visible indication via the window that the ambient temperature has fallen to the predetermined lower threshold temperature. The indicator window may be any suitable shape, such as circular, cross-shaped, rectangular, square etc. A cross-shaped indicator window may be appropriate in miniature devices, where there is less space for user instructions to be printed on the device.

Preferably, the first side of the membrane comprises a masking layer. The masking layer may be comprised of a permeable metal foil, which is bonded to the first side of the membrane by, for example, a hot stamping process. Alternatively a metalized masking layer may be deposited onto one side of the membrane by a vaporized deposition process. The purpose of the masking layer is to mask the second liquid from being visible through the window when it is disposed on the first side of the membrane (i.e. before the temperature has fallen to the lower threshold). Since the membrane infused with the first liquid may be somewhat transparent or translucent, the masking layer ensures that the second liquid is completely masked from the window until it migrates through the membrane, thereby ensuring excellent visual contrast between the "before" and "after" states of the device. The foil is sufficiently dense to obstruct light, but is microscopically porous so as to allow mass transfer and migration of the second liquid therethrough. Typically, the masking layer has a thickness of 1-10 microns. Typically, the masking layer is comprised of a metal, such as aluminium.

The device can be fabricated as a flexible thin label in an embodiment in which the second liquid (colorant) is infused into a pad or second membrane which permits an almost flat version of the product. The liquid in this saturated pad is in contact with the first (freezable) liquid membrane, optionally through a foil and is immiscible with the first liquid.

In an alternative embodiment, the membrane is elongate having the first zone at a first end thereof and the second zone at a second end thereof. In this alternative embodiment, the second liquid migrates along a longitudinal axis of the membrane, as well as through the thickness of the membrane. Lateral migration of the second liquid advantageously enables the device to indicate a period over which the ambient temperature has fallen to or below the lower threshold temperature. An extent of migration along the longitudinal axis is indicative of this period.

Preferably, the device according to the alternative embodiment comprises a window which is configured and positioned for visually inspecting a length of the membrane. Typically, the window has substantially the same dimensions as the elongate membrane. One or more time indicator markings may be positioned relative to the window to indicate an elapsed time to the user.

Preferably, the first freezable liquid is relatively more hydrophobic than the second liquid to ensure that the membrane is impervious to the second liquid at temperatures above the lower threshold temperature. However, combinations where the first freezable liquid is relatively more hydrophilic than the second liquid are equally possible.

Preferably, the first freezable liquid comprises a fatty acid ester, a fatty acid or combinations thereof. Typically, the fatty acid is any carboxylic acid comprising an aliphatic chain (which may be saturated, unsaturated, branched or straight) having from 4 to 50 (preferably from 4 to 25) carbon atoms. Similarly, the term "fatty acid esters" refers to esters (e.g. $C_{1-8}$alkyl esters) of the fatty acids described above.

Fatty acid esters and fatty acids are particularly preferred, because they are inexpensive, available in a wide range of melting points and have sharp, well-defined melting and freezing points. Suitable first freezable liquids include: Diethyl Sebacate (FP −7° C.); Methyl Laurate (FP +1° C.), Ethyl Myristate (FP +7° C.), Methyl Myristate (FP +13° C.), Ethyl Palmitate (FP +19° C.) and Undecelenic Acid (FP +17° C.). All these fatty acids and esters are approved as safe to use by the FDA as flavour and fragrance additives. Therefore, a further advantage of the present invention is that it avoids the use of any potentially harmful ingredients. Other suitable fatty acid esters and fatty acids will be readily apparent to the person skilled in the art. In general, fatty acid esters and fatty acids have relatively predictable properties in the context of the present invention and may be selected on the basis of their freezing points for any required application.

In some embodiments, the first freezable liquid may be coloured (e.g. green or yellow) by including a small amount of dye in the first liquid. A coloured first liquid provides a greater visual impact to users (e.g. from green to red) to indicate that the lower threshold temperature has been reached.

Preferably, the second liquid is coloured so as to provide a clear, visible indication to the user when it reaches the second zone of the membrane. The second liquid typically comprises a hydrophilic vehicle (e.g. water, glycols, polyols etc.) and a dye. The viscosity of the second liquid affects the rate of migration through the membrane and the second liquid may be formulated accordingly to provide a desired response time for the device. It is, of course, implicit that the second liquid should be flowable at the freezing point of the first liquid. In other words, the pour point or freezing point of the second liquid should be lower than the freezing point of the first liquid. In cases where the first liquid has a particularly low freezing point (e.g. less than 0° C.), then the second liquid may include one or more antifreeze additives, such as propylene glycol, in order to depress its pour point or freezing point.

The skilled person will be aware of a variety of hydrophilic dyes for use in the second liquid and it is not necessary to list suitable dyes exhaustively herein. The present inventors have found that Liquitint® dyes (as commonly used in household detergents) provide particularly good contrast for sharp indication of the lower threshold temperature. A range of suitable Liquitint® dyes include Liquitint® Red MX, Liquitint® PG Blue, Liquitint® Yellow EC, Liquitint® Red XC, Liquitint® Blue RE, Liquitint® Violet CT, Liquitint® Blue EA, Liquitint® Orange LG and Liquitint® Crimson. A particularly suitable formulation for the second liquid comprises Liquitint® Crimson diluted with water. A particularly preferred combination employs the Liquitint® Crimson formulation with a 180 micron thick HDPE membrane impregnated with silica particles having a ~1 micron pore size.

In one embodiment, the devices of the present invention are active over an entire lifetime of the device—that is, from the time of manufacture onwards. Although such devices have the advantage of being simple and inexpensive, a disadvantage of such devices is that they must be stored always above the predetermined threshold temperature, which places demands on long-term storage requirements.

In an alternative embodiment, the devices of the present invention are active only subsequent to activation of the device by a user. In the embodiment in which the device is a flat with two liquid-infused membranes activation can be achieved by the removal of a thin plastics film from between the two membranes.

The present Applicant has hitherto described time indicator devices, which can be activated by a user via a depressible blister and a pressure-rupturable seal (see, for example,
PTL 0003: U.S. Pat. No. 7,232,253 A (TIMESTRIP UK LIMITED). 2007 Jun. 19.
the contents of which are herein incorporated by reference). An analogous mechanism for device activation is equally applicable to the devices according to the present invention.

Accordingly, the device preferably comprises activation means for releasing the second liquid into contact with the first zone of the membrane. Preferably, the device comprises a reservoir in the form of a sealed blister containing the second liquid, and the second liquid is releasable from the blister upon activation of the activation means. Typically, the activation means comprises a manually-depressible button, which is defined by at least part of an exterior surface of the blister. The device further comprises a pressure-rupturable seal for releasing the second liquid when pressure is applied to the exterior surface of the blister. Once the seal is ruptured, the second liquid is channelled into contact with the first zone of the membrane, thereby activating the device.

Other forms of activation means will be readily apparent to the person skilled in the art. For example, a reservoir containing the second liquid may have a releasable barrier wall in the form of a releasable or frangible strip. A user may pull on a tab at one end of the strip to release the second liquid from the reservoir so that the second liquid is brought into contact with the first zone of the membrane, thereby activating the device.

In a further aspect, the present invention provides a product having the device according to the present invention affixed thereto.

In a further aspect, the present invention provides a kit comprising the device according to the present invention and an upper threshold temperature indicator. An upper threshold indicator is a device which indicates whether an ambient temperature has risen to or above a predetermined upper threshold temperature. In some cases, upper threshold temperature indicators provide an indication of a period of time spent at or above the predetermined threshold temperature. Upper threshold indicator devices are well known in the art and are described in, for example, U.S. Pat. No. 3,954,011, U.S. Pat. No. 5,368,905 and U.S. Pat. No. 5,709,472. The Applicant's Threshold Plus™ and Timestrip Plus™ devices exemplify commercially-available upper threshold temperature indicators, which are suitable for use in kits according to this aspect of the present invention.

The kit may comprise discrete upper and lower threshold devices, which may be attached independently to a product.

Alternatively, there may be provided an integrated device, wherein a single platform or substrate comprises the upper and lower threshold devices in, for example, a side-by-side or end-on-end arrangement. The integrated device may be attachable as a single unit to a product using a peel-away adhesive backing. If the upper and lower threshold devices have respective activation mechanisms with respective user-depressible blisters, then a single button may be provided on the integrated device to depress both blisters simultaneously. Alternatively, the integrated device may carry instructions for users to depress each of blisters simultaneously when activating the device.

The kit or integrated device according to the present invention advantageously enables users to determine whether an ambient temperature has risen or fallen outside a predetermined temperature window. For example, a red indication on either device may be indicative of a temperature excursion outside the predetermined temperature window. Such kits may be useful for the storage of vaccines, which are optimally stored at 2-8° C.

BRIEF DESCRIPTION OF THE DRAWINGS

Preferred embodiments of the present invention will now be described, by way of example only, with reference to the accompanying drawings, in which.

DETAILED DESCRIPTION OF PREFERRED EMBODIMENTS

Figure 1A:
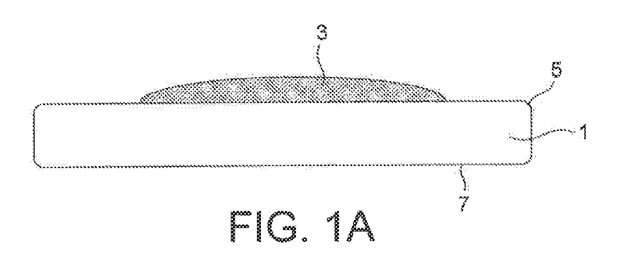
FIGS. 1A-F are schematic side views of an infused membrane at different stages of migration of the second liquid through the membrane for an embodiment in which the second liquid is fluid and a flat version where the second liquid is soaked into a pad.
Figure 1B:
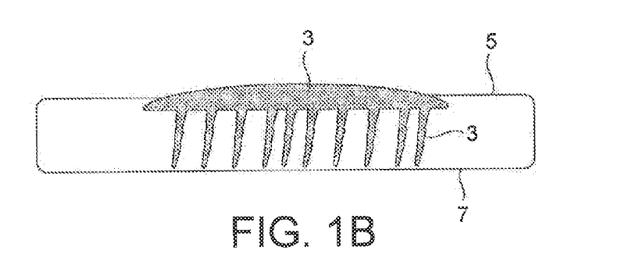
Figure 1C:
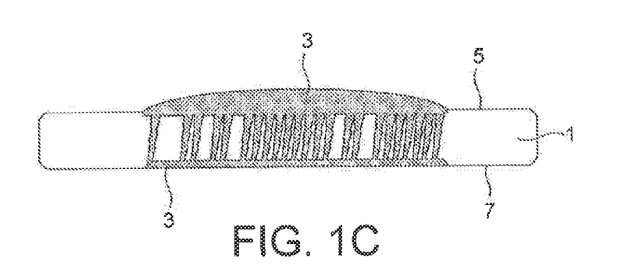

Referring to FIGS. 1A-C, there are shown schematic side views of a microporous membrane 1 infused or soaked with a hydrophobic first liquid, such as a fatty acid or fatty acid ester. The first liquid has a respective freezing point which defines a predetermined lower threshold temperature of the device. As shown in FIG. 1A, the ambient temperature is above the freezing point of the first liquid and a hydrophilic second liquid 3, such as an aqueous dye-based solution, is in contact with a first side 5 of the membrane 1 in FIG. 1A. The membrane 1 infused with the first liquid is impervious to the second liquid whilst the ambient temperature is above the freezing point of the first liquid.

FIG. 1B shows the same membrane 1 after the temperature has fallen to the freezing point of the first liquid. The first liquid has solidified or crystallized against the fibrous structure of the membrane 1, enabling micro voids to form throughout the frozen first liquid. With the solidification of the first liquid, the second liquid 3 is able to migrate through the microporous membrane 1 and towards a second side 7 thereof.

In FIG. 1C, the second liquid 3 has migrated all the way through the membrane 1 to the second side 7, typically staining the second side irreversibly. The second side 7 remains stained by the second liquid 3, even after the temperature rises above the lower threshold temperature and the first liquid melts.

Figure 1D:
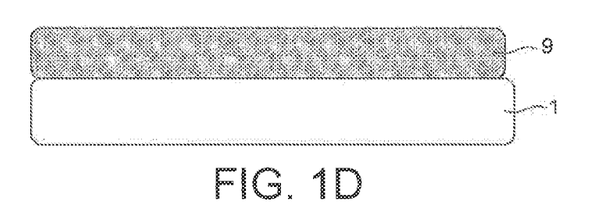
Figure 1E:
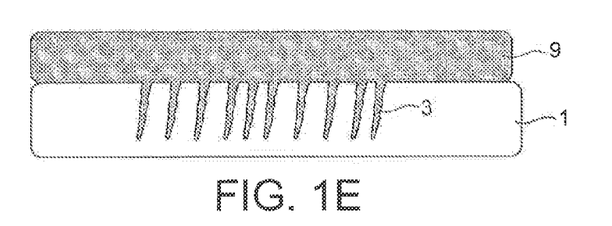
Figure 1F:
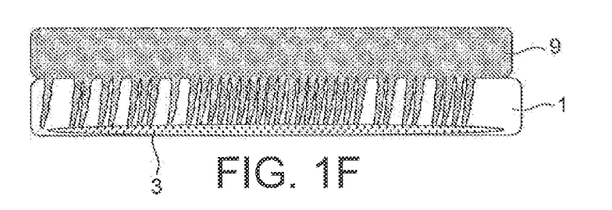
Figure 2:
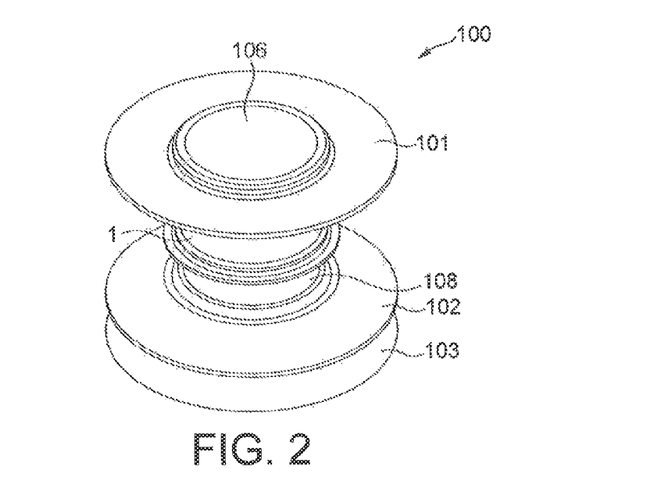
FIG. 2 is an exploded perspective of a device according to a first embodiment of the present invention.
Figure 3:
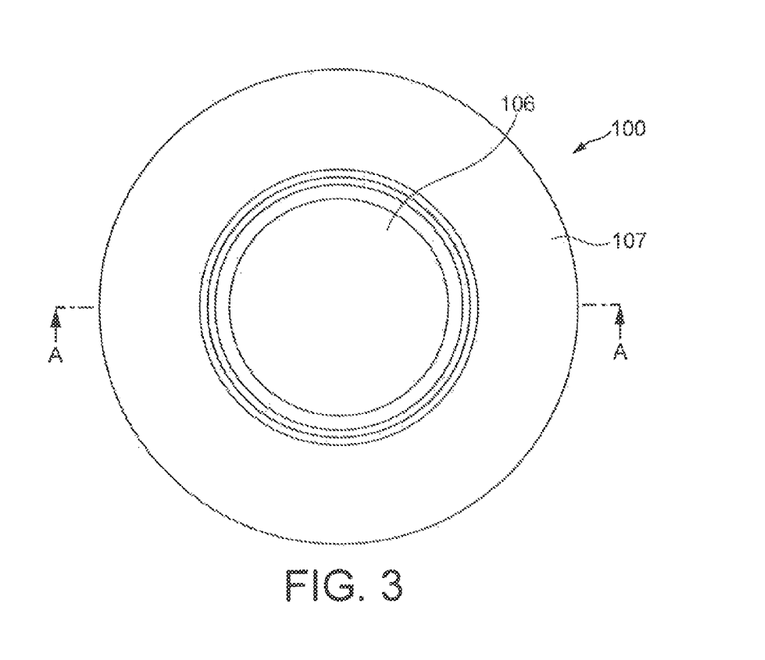
FIG. 3 is a plan view of the device shown in FIG. 2.

FIGS. 1D to 1F show the same sequence where the second liquid is soaked into a pad or second membrane 9 of its own in order to allow a completely flat construction as illustrated in the fourth and fifth embodiments of the invention.

In one preferred embodiment, the membrane 1 may be a polyethylene (HDPE) microporous membrane having a pore size of about 1 micron. The membrane 1 is impregnated with silica particles and has a thickness of about 180 microns. The same material can be used for the pad 9. The pad could also be a pad of blotting or tissue paper or cotton material. Depending on the type of application for which the device will be used, the membrane is saturated with a first liquid, which is typically a fatty acid or fatty acid ester having a freezing point suitable for the particular application. For example, a device suitable for monitoring potential degradation of vaccines may employ Methyl Laurate (FP +1° C.) as the first liquid. In this preferred embodiment, the second liquid 3 is an aqueous formulation comprised of Liquitint® Crimson, so as to provide a positive red indication. Other dyes may, of course, be employed to provide different coloured indicators.

The principle of the second liquid 3 migrating through the membrane 1 infused with the first liquid, as described in connection with FIGS. 1A-F, is employed in each of the indicator devices described herein below, in accordance with the embodiments of the present invention.

Binary Indicator Device

Referring to FIGS. 2 to 5, there is shown a simple binary indicator device 100, according to the first embodiment, having no activation mechanism. The device 100 is active for an entire lifetime of the device—that is, from the time of manufacture.

A body of the device 100 is comprised of a pair of polymer discs 101 and 102 bonded together by any suitable heat-welding process. Each of the polymer discs 101 and 102 may comprise barrier layers (not shown) for hermetically sealing the internal components of the device. The lower disc 102 is generally planar having an adhesive layer 103 bonded to a lower surface thereof. The adhesive layer 103 typically has a peel-away strip enabling the device 100 to be attached to products, as required.

Figure 4:
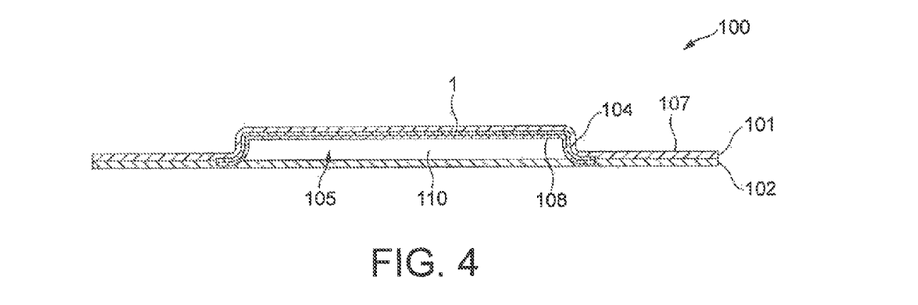
FIG. 4 is a longitudinal section through line A-A of FIG. 3.
Figure 5:
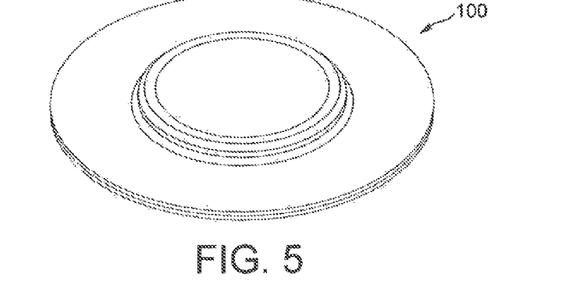
FIG. 5 is a top perspective of the device shown in FIG. 2.
Figure 6:
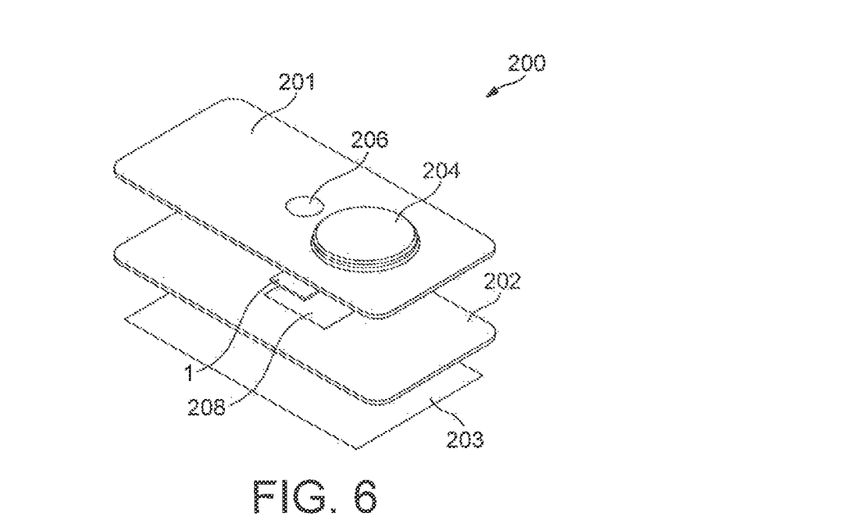
FIG. 6 is an exploded perspective of a device according to a second embodiment of the present invention.
Figure 7:
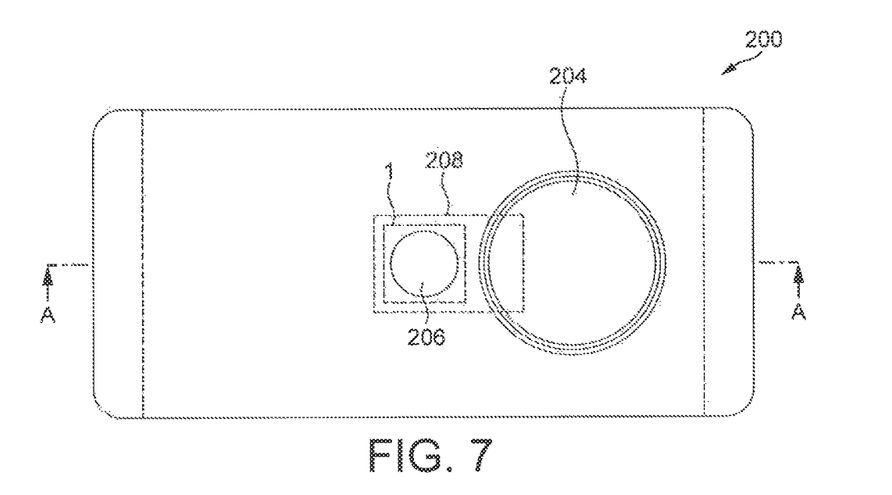
FIG. 7 is a plan view of the device shown in FIG. 6, with underlying features shown in dotted outline.

As best shown in FIG. 4, the upper disc 101 has a central recessed portion 104, which defines an internal cavity 105 for the device. The upper disc 101 is generally transparent such that a central circular portion defines an indicator window 106. An annular outer region 107 of the upper disc 102 may be printed with a masking layer as well as instructions, branding etc.

The membrane 1 infused with the first liquid (e.g. Methyl Laurate) is housed within the internal cavity 105 and has a permeable foil layer 108 stamped onto a lower surface thereof. The remainder of the volume of the internal cavity 105, between the membrane 1 and the lower disc 102, defines a liquid chamber 110 for storing the second liquid 3 (e.g. Liquitint® Crimson solution). Once manufactured, the second liquid 3 is always in contact with a lower surface of the membrane 1 via the permeable foil layer 108.

By way of example, in use, the device 100 is first checked to ensure that there is no red colour visible via the indicator window 106. The foil layer 108 provides a normally pale white background, which indicates that the device is ready to use. The device 100 is then affixed to a product (e.g. a carton of vaccines) and checked again after transit in a chilled container. If, during transit of the product, the ambient temperature fell below a predetermined lower threshold temperature (defined by the freezing point of the first liquid), then the red second liquid will have migrated through the membrane 1 to the upper surface thereof and will be clearly visible via the indicator window 106. A red colour provides a positive indication to the user that the product may have degraded and should either be checked for degradation or discarded. However, if the colour visible through the indicator window 106 remains pale white, then the user receives a positive indication that the product has not been exposed to temperatures below the predetermined lower threshold. This information, optionally in combination with information from other indicator(s) (e.g. an upper temperature threshold indicator) indicates to the user that the product is safe to use.

Binary Indicator Device with Activation Mechanism

Referring to FIGS. 6 to 9, there is shown a binary indicator device 200, according to the second embodiment, having an activation mechanism. The device 200 is active only after a user has depressed a button to activate the device. A similar activation mechanism, albeit for a time indicator device, was described previously by the Applicant in PTL 0004: U.S. Pat. No. 7,232,253 A (TIMESTRIP UK LIMITED). 2007 Jun. 19.

A body of the device 200 is comprised of a pair of polymer plates 201 and 202 bonded together by any suitable heat-welding process. Each of the polymer plates 201 and 202 may comprise barrier layers (not shown) for hermetically sealing the internal components of the device. The lower plate 202 is generally planar and provides a degree of stiffness for the device. An adhesive layer 203 is bonded to a lower surface of the lower plate 202 so as to enable the device 200 to be attached to products, as required.

Figure 8:
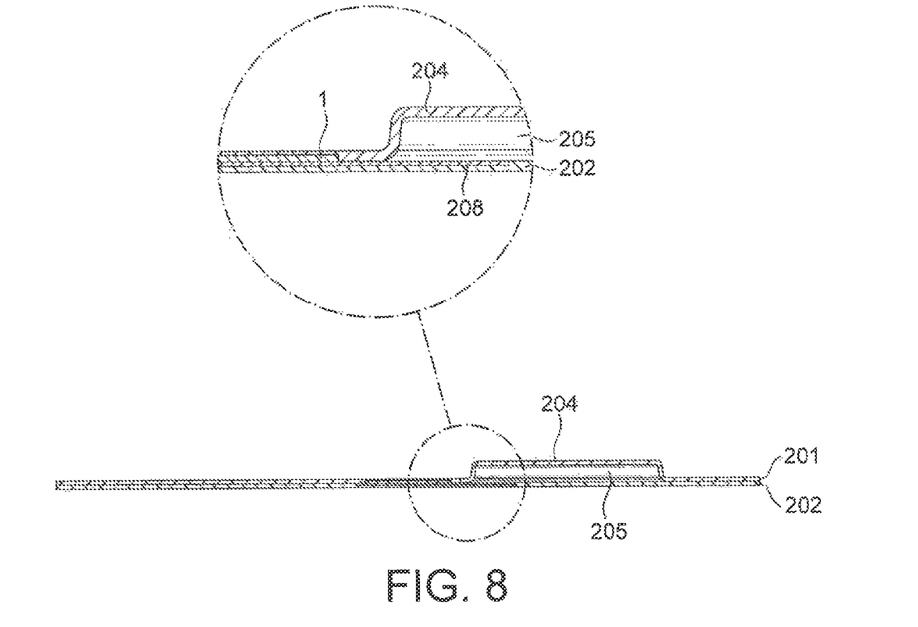
FIG. 8 is a longitudinal section through line A-A of FIG. 7, with a corresponding magnification of a seal region.
Figure 9:
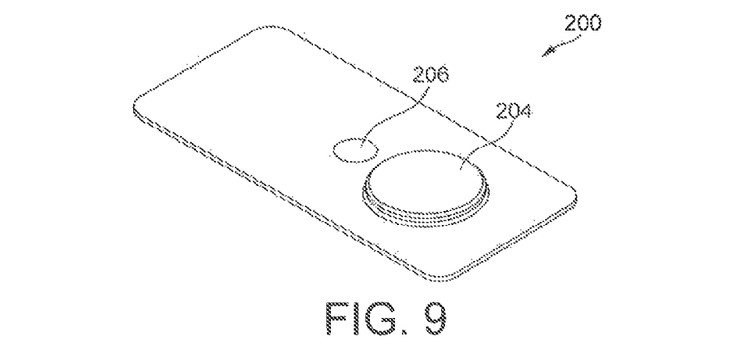
FIG. 9 is a top perspective of the device shown in FIG. 6.
Figure 10:
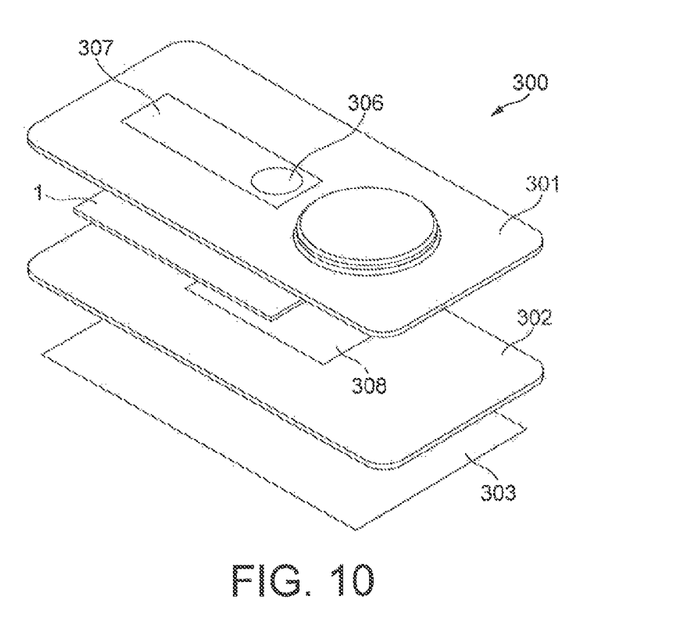
FIG. 10 is an exploded perspective of a device according to a third embodiment of the present invention.
Figure 11:
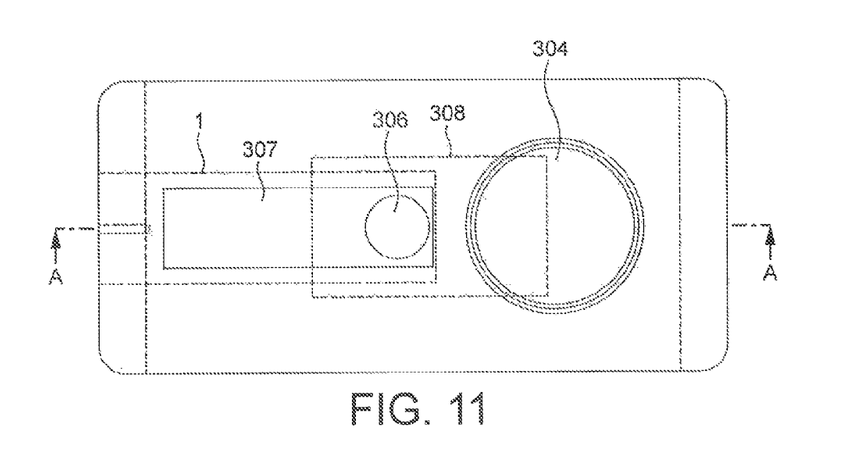
FIG. 11 is a plan view of the device shown in FIG. 10, with underlying features shown in dotted outline.

As best shown FIG. 8, the upper plate 201 has a recessed or dished portion, which defines a blister 204 for storing the second liquid 3. The upper plate 201 is flexible so as to enable users to depress the blister and apply pressure to the second liquid 3 stored inside a liquid chamber 205 of the blister 204. An exterior surface of the blister 204 defines a button for users to push when the device is to be activated.

The membrane 1 and a permeable foil layer 208 are sandwiched between the upper and lower plates 201 and 202. An upper surface of the membrane 1 is bonded to the upper plate 201 (e.g. by heat-welding) and aligned with an indicator window 206 defined in the upper plate. The upper plate 201 is generally transparent with regions outside the zone of the indicator window 206 being printed with a masking layer as well as instructions, branding etc.

The foil layer 208 has an upper surface stamped to a lower surface of the membrane 1, while a lower surface of the foil layer contacts the lower plate 202. The foil layer 208 extends from the membrane 1 partially into the liquid chamber 205 defined by the blister 204. Since lamination between the foil layer 208 and polymer plates 201 and 202 is relatively weak, this interface acts as a pressure-rupturable seal for the blister 204. Accordingly, when manual pressure is applied to an exterior surface of the blister 204, a hydraulic pressure of the second liquid 3 contained within the blister forces the upper plate 201 to delaminate from the lower plate 202. This allows the second liquid 3 to be channelled into contact with the lower surface of the membrane 1, while the upper (indicating) surface of the membrane remains fixedly bonded to the upper plate 201. With the second liquid in contact with the lower surface of the membrane 1 (via the permeable foil layer 208), the device 200 becomes active and is sensitive thereafter to a fall in ambient temperature below the predetermined lower threshold temperature.

Figure 14:
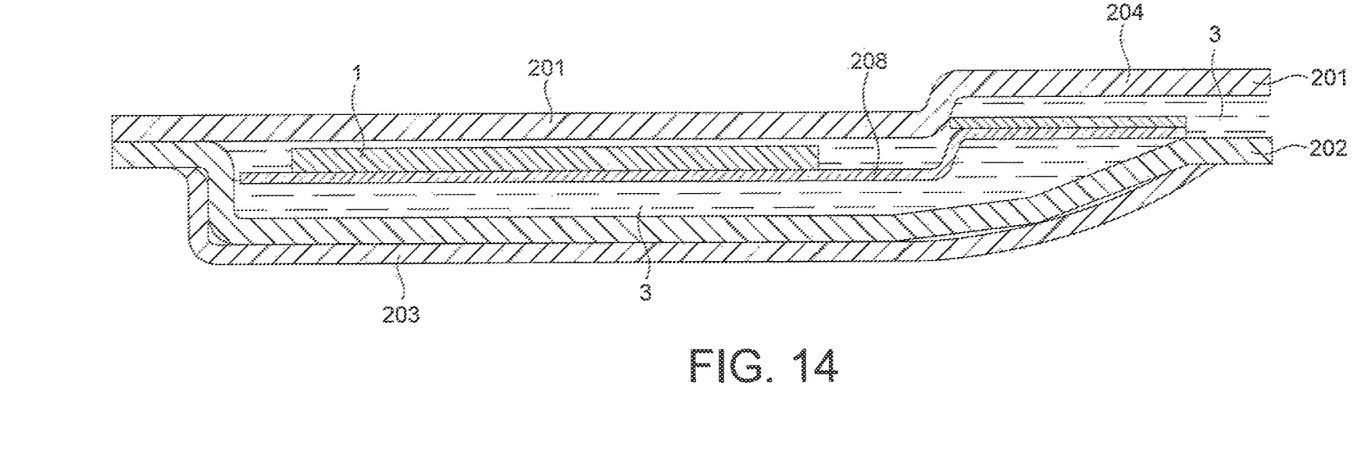
FIG. 14 is a magnified longitudinal section of the device according to the second embodiment after activation.

Referring briefly to FIG. 14, there is shown a magnified portion of the device 200 after activation. After depressing the exterior surface of the blister 204, hydraulic pressure of the second liquid 3 has forced apart the upper plate 201 from the lower plate 202 in a zone of weak lamination defined by the extent of the foil layer 208. This enables the second liquid 3 to be channelled into contact with the lower surface of the membrane 1 having the permeable foil layer 208. The lower plate 202 bulges outwards to accommodate the second liquid 3 in the zone of weak lamination. Since the upper (indicating) surface of the membrane 1 is securely heat-welded to the upper plate 201, none of the second liquid 3 reaches this surface immediately after blister-activation. Thus, secure attachment of the indicating surface of the membrane 1 to the upper plate 201 prevents any false readings resulting from blister-activation.

Significantly, in addition to providing the pressure-rupturable seal, the foil layer 208 also masks the second liquid 3 from the indicator window 206 in the same way as described above in connection with the first embodiment. Thus, the foil layer 208 has an important dual role in the device 200 according to the second embodiment.

In use, the device 200 is affixed to a product and the blister 204 is depressed by a user to activate the device. Advantageously, the device 200 does not need to be stored at any particular temperature before being used. The indicator window 206 may be monitored by the user after activation in order to detect whether the device 200 has been exposed to ambient temperatures at or below the predetermined threshold temperature.

Time-Dependent Indicator Device Having Activation Mechanism

Referring to FIGS. 10 to 13, there is shown an indicator device 300, according to the third embodiment, having an activation mechanism and a time-dependent progress window. The device 300 is active only after a user has depressed a button to activate the device and the progress window provides an indication to users of a period over which the ambient temperature has fallen to or below the predetermined lower threshold temperature, as well as a simple binary indication.

The device 300 is similar in construction to the device 200 described above. A body of the device 300 is comprised of a pair of polymer plates 301 and 302 bonded together by any suitable heat-welding process. Each of the polymer plates 301 and 302 may comprise barrier layers (not shown) for hermetically sealing the internal components of the device. The lower plate 302 is generally planar and provides a degree of stiffness for the device. An adhesive layer 303 is bonded to a lower surface of the lower plate 302 so as to enable the device 300 to be attached to products, as required.

Figure 12:
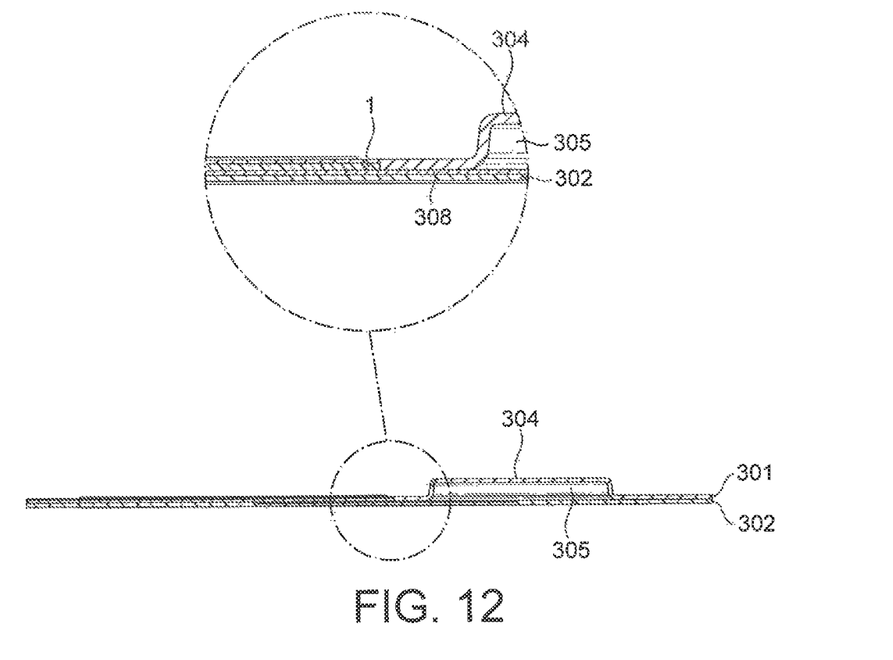
FIG. 12 is a longitudinal section through line A-A of FIG. 11 with a corresponding magnification of a seal region.
Figure 13:
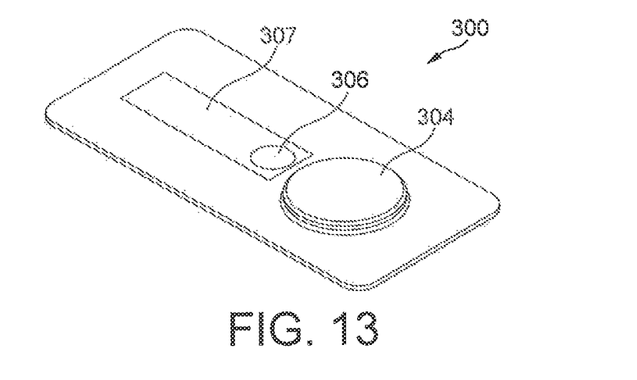
FIG. 13 is a top perspective of the device shown in FIG. 11.

As best shown in FIG. 12, the upper plate 301 has a recessed or dished portion, which defines a blister 304 for storing the second liquid 3. The upper plate 301 is flexible so as to enable users to depress the blister and apply pressure to the second liquid 3 stored inside a liquid chamber 305 of the blister 304. An exterior surface of the blister 304 defines a button for users to push when the device is to be activated.

The membrane 1 is generally elongate and extends along a longitudinal axis of the device 300. The membrane and a permeable foil layer 308 are sandwiched between the upper and lower plates 301 and 302. An upper surface of the membrane 1 is bonded to the upper plate 201 (e.g. by heat-welding) and aligned with a binary indicator window 306 as well as a time-dependent progress window 307 defined in the upper plate. The upper plate 301 is generally transparent with regions outside the zones of the indicator and progress windows 306 and 307 being printed with a masking layer as well as instructions, branding etc.

The foil layer 308 has an upper surface stamped to a lower surface of the membrane 1, while a lower surface of the foil layer contacts the lower plate 302. The foil layer 308 extends partially along a length of the membrane 1 and partially into the liquid chamber 305 defined by the blister 304. Since lamination between the foil layer 308 and polymer plates 301 and 302 is relatively weak, this interface acts as a pressure-rupturable seal for the blister 304. Accordingly, when pressure is applied to an exterior surface of the blister 304, the hydraulic pressure of the second liquid 3 forces the upper plate 301 to delaminate from the lower plate 302. This allows the second liquid 3 to be channelled into contact with the lower surface of the membrane 1, while the upper surface of the membrane remains fixedly bonded to the upper plate 201. With the second liquid 3 in contact with the lower surface of the membrane 1 (via the permeable foil layer 308), the device 300 becomes active and is sensitive thereafter to a fall in ambient temperature below the predetermined lower threshold temperature. It will be appreciated that, after blister-activation of the device 300, the second liquid 3 is forced into contact with the lower surface of the membrane 1 analogously with the device shown in FIG. 14.

In the device 300, when the first liquid infused in the membrane 1 freezes, the second liquid 3 migrates relatively rapidly through a thickness of the membrane towards the indicator window 306 so that the indicator window provides an initial binary indication to the user. If the ambient temperature remains at or below the predetermined threshold, the second liquid 3 then migrates laterally along a length of the membrane 1. The progress of this lateral migration can be monitored via the progress window 307 defined in the upper plate 301. With simple calibration of the device 300, the time spent at or below the lower threshold temperature can be readily determined. Time indicator markings (not shown) may be printed on the progress window as a visual indication to the user of the time spent at or below the lower threshold temperature, subsequent to activation of the device.

Accordingly, it will be appreciated that the device 300 provides a more sophisticated means by which users can assess the quality of products that are sensitive to temperatures below a predetermined lower threshold temperature. In some instances, a product may be relatively insensitive to short periods spent below the lower threshold temperature, in which case the device 300 can act as a useful tool for end users.

Of course, the skilled person will readily appreciate that the time-dependency feature of the device 300 may be utilized without necessarily employing the activation mechanism of the blister 304. In other words, time-dependency could be readily incorporated into a device of the type described above in connection with the first embodiment.

Flexible Label Embodiments

Figure 15:
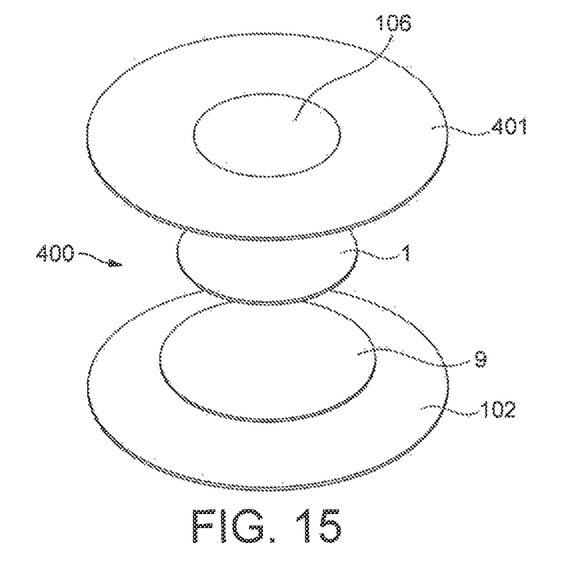
FIG. 15 is an exploded perspective view of a fourth embodiment of the device fabricated as a flat flexible label.

The fourth embodiment of the device 400 is similar to the first embodiment and like reference numerals have been used for the same parts. Instead of a liquid chamber the second liquid and dye is soaked into a pad 9 so that it is saturated and the liquid can move into the first membrane when the first membrane switches to a permeable state. The pad 9 sits on the bottom sealing layer 102. The top layer 401 is also flat rather than being dished as no liquid reservoir is required.

Figure 16:
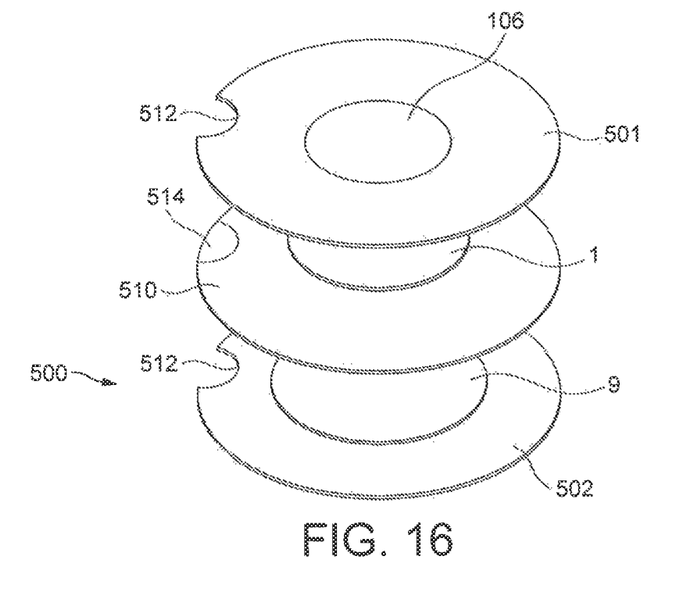
FIG. 16 is an exploded perspective view of a fifth embodiment of the device similar to the fourth embodiment but capable of activation.
Figure 17:
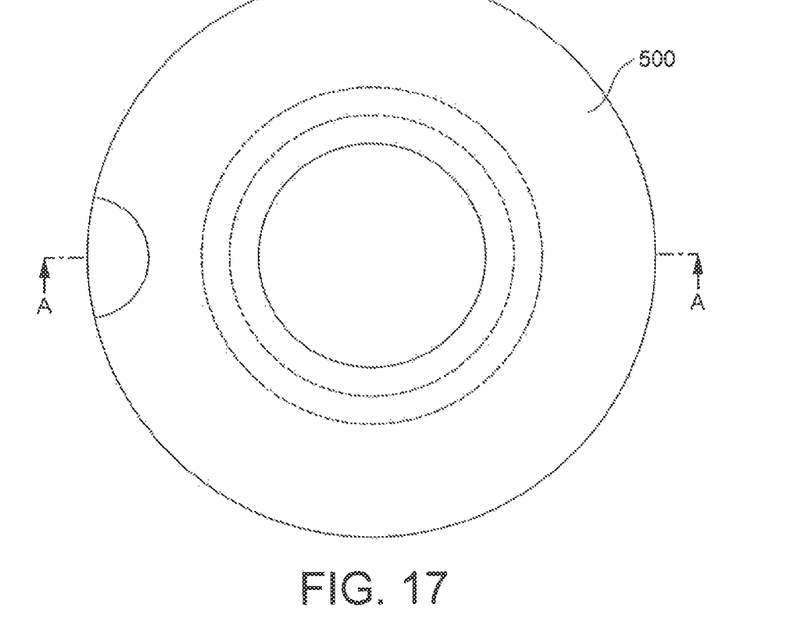
FIG. 17 is a plan view of the device of FIG. 16.
Figure 18:
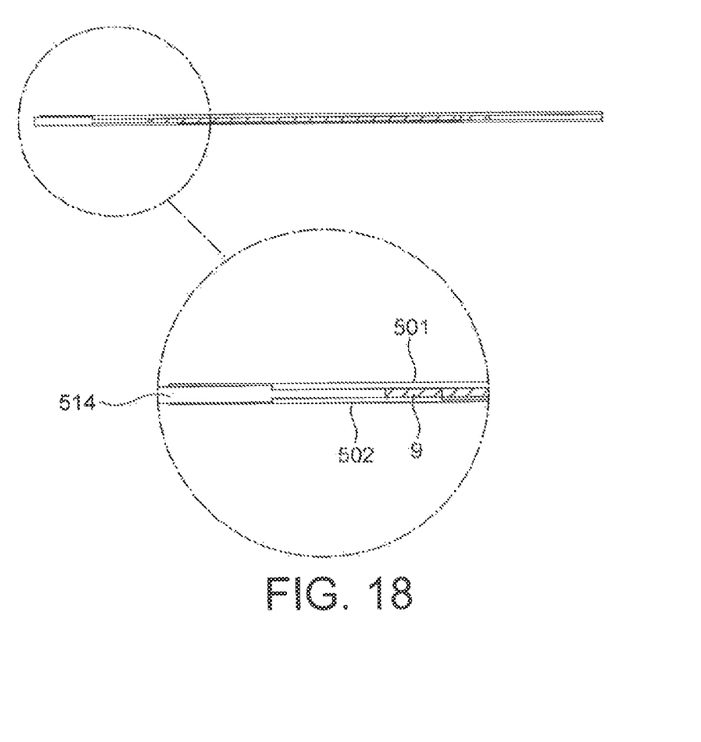
FIG. 18 is a section on the line A-A in FIG. 17 with a corresponding magnification of an activation tab region.

This flat device can be provided with an activation feature as shown in the fifth embodiment of the device 500 described with reference to FIGS. 16 to 18. In this device a thin plastic film 510 is interposed between the membranes 1 and 9. The upper and lower discs 501 and 502 have cut-outs 512 to enable an enlarged tab 514 on the film 514 to be exposed at one side of the device 500. The layer 510 can be gripped by means of this tab 514 and slid out from the package to bring the two membranes into contact with one another activating the device.

Other features of these embodiments are as previously described. However the flat construction has considerable production and market advantages. It does not add bulk to the product to which it is applied. The devices 400 and 500 have been shown as circular patches but could be arranged so that the second liquid is able to migrate along the membrane.

The invention claimed is:

1. A device for indicating that an ambient temperature has fallen to or below a predetermined lower threshold temperature, said device comprising:
 a porous membrane having first and second spatially separate zones;
 a first freezable liquid infused in the porous membrane, the first freezable liquid having a freezing point corresponding to the predetermined lower threshold temperature;
 a second liquid for contacting the first zone of the porous membrane, said second liquid being immiscible with said first liquid; and
 means for indicating migration of the second liquid at least partially from the first zone to the second zone,
 wherein the membrane infused with the first liquid is impervious to the second liquid above the threshold temperature and is permeable to the second liquid at or below the threshold temperature.

2. The device of claim 1, further comprising a pad infused with the second liquid.

3. The device of claim 2, further comprising activation means for releasing the second liquid into contact with the first zone of the membrane.

4. The device of claim 3, wherein the activation means comprises a removable film interposed between the pad and the membrane.

5. The device of claim 2, wherein a first side of said membrane defines said first zone and an opposite second side of said membrane defines said second zone, said migration being through a thickness of said membrane from said first side to said second side.

6. The device of claim 5, wherein said means for indicating comprises an indicator window positioned for visually inspecting the second side of the membrane.

7. The device of claim 5, wherein said first side of said membrane comprises a masking layer.

8. The device of claim 2, wherein said membrane is elongate having said first zone at a first end thereof and said second zone at a second end thereof, said migration being along a longitudinal axis of said membrane.

9. The device of claim 1, wherein a first side of said membrane defines said first zone and an opposite second side of said membrane defines said second zone, said migration being through a thickness of said membrane from said first side to said second side.

10. The device of claim 9, Wherein said means for indicating comprises an indicator window positioned for visually inspecting the second side of the membrane.

11. The device of claim 9, wherein the first side of the membrane comprises a masking layer.

12. The device of claim 1, wherein said membrane is elongate having said first zone at a first end thereof and said second zone at a second end thereof, said migration being along a longitudinal axis of said membrane.

13. The device of claim 1, wherein the first freezable liquid is relatively more hydrophobic than the second liquid.

14. The device of claim 1, wherein the first freezable liquid comprises a fatty acid ester, a fatty acid, or combinations thereof.

15. The device of claim 1, wherein the second liquid is coloured.

16. The device of claim 1, wherein said membrane is comprised of a microporous polymer having a pore size in the range of 100 nm to 2 microns.

17. The device of claim 16, wherein the microporous polymer is impregnated with hydrophilic inorganic particles.

18. A product having the device according claim 1 affixed thereto.

19. A kit or an integrated device comprising a device according to claim 1 and an upper threshold temperature indicator device.

20. The device of claim 1, further comprising activation means for releasing the second liquid into contact with the first zone of the membrane.

* * * * *